United States Patent
Kishi et al.

[15] 3,691,181
[45] Sept. 12, 1972

[54] CERTAIN ACYL DERIVATIVES OF THE ANTIBIOTIC T-2636C

[72] Inventors: Toyokazu Kishi, Nara; Setsuo Harada; Komei Mizuno, both of Osaka; Eiji Higashide, Hyogo; Motoo Shibata, Osaka, all of Japan

[73] Assignee: Takeda Chemical Industries, Ltd., Higashi-ku, Osaka, Japan

[22] Filed: Oct. 27, 1969

[21] Appl. No.: 869,864

[30] Foreign Application Priority Data

Oct. 26, 1968 Japan ........................43/7143

[52] U.S. Cl. .........260/295.5 P, 260/343.5, 424/266, 424/283
[51] Int. Cl. ...........................C07d 31/36, C07d 7/06
[58] Field of Search ......................260/295.5 P, 343.5

[56] References Cited

UNITED STATES PATENTS 3,321,484  5/1967  Krimmel.................260/295.5

OTHER PUBLICATIONS

Roberts et al., Basic Principles of Organic Chemistry, Benjamin Publishers, pages 530– 531, (1965) QD 251 R 58 C.6

*Primary Examiner*—Alan L. Rotman
*Attorney*—Wenderoth, Lind & Ponack

[57] ABSTRACT

Acyl derivatives of Antibiotic T-2636C useful for inhibiting the growth of Gram positive bacteria and being effective against strains resistant to *Oleandomycin* and *Erythromycin*, and method for production thereof.

18 Claims, No Drawings

CERTAIN ACYL DERIVATIVES OF THE ANTIBIOTIC T-2636C

This invention relates to pharmaceutically useful acyl derivatives of the antibiotic T-2636C and a method for producing them.

It has been known that a new antibiotic called "Antibiotic T-2636C" is produced in a cultured broth of a new strain of the genus *Streptomyces*, *Streptomyces rochei* var. *volubilis*, and can be recovered in good yield from the cultured broth (cf. Belgian Pat. No. 715,356).

Further study of this new antibiotic by the present inventors has given the following results:

1. The chemical structure of the antibiotic T-2636C (hereinafter often referred to as "C") is as shown in the formula

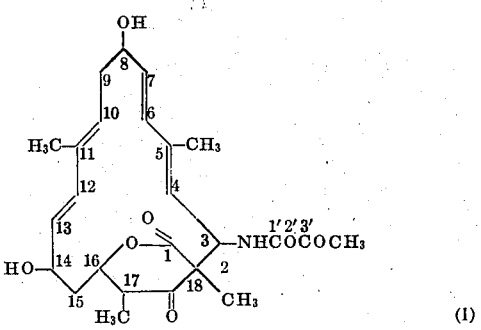

2. antibiotic having a hydroxy group at each of positions 8 and 14;

20 therefore mono or diacyl derivatives of T-2636C are obtainable according to particular reaction conditions;

30 the acyl derivatives of T-2636C can be recovered in desired purity by chromatography or other per se conventional means; and 4. thus obtained acyl derivatives of T-2636C show improved therapeutic effect.

This invention is the culmination of the above findings and relates to pharmaceutically useful acyl derivatives of antibiotic T-2636C, which is acylated at position 14 or 8 and a method for producing them (hereinafter, the acyl derivatives of T-2636C are often referred to simply as "C-(8 or 14) - acyl derivatives.")

The C-8 or 14 - acyl derivative are produced by reacting C with a molecular equivalent of an acylating agent containing an acyl group and recovering said derivatives.

The term "acyl group" refers to an organic carboxylic acid residue which may, for example, be derived from an organic carboxylic acid R·COOH and is represented by the general formula R·CO— wherein R is hydrogen, alkyl of one to five carbon atoms or alkenyl of up to five carbon atoms, both optionally substituted by carboxy or halogen groups, aryl of six to nine carbon atoms, optionally substituted by halogen, pryidino, optionally substituted by halogen, aralkyl of seven to 10 carbon atoms, optionally substituted by halogen, and pyridino substituted by alkyl of one to five carbon atoms, and optionally substituted by halogen.

The C-8 or 14 - acyl derivatives are exemplified by the following compounds:

T-2636C - 14 - propionate
T-2636C - 14 - butyrate
T-2636C - 14 - valerate
T-2636C - 14 - crotonate
T-2636C - 14 - nicotinate
T-2636C - 14 - benzoate
T-2636C - 14 - p-propyl-benzoate
T-2636C - 14 - phenylpropionate
T-2636C - 14 - phenylvalerate
T-2636C - 8 - formate
T-2636C - 8 - acetate
T-2636C - 8 - trifluoro-acetate
T-2636C - 8 - propionate
T-2636C - 8 - valerate
T-2636C - 8 - crotonate
T-2636C - 8 - benzoate
T-2636C - 8 - p-propyl-benzoate
T-2636C - 8 - m-bromo-benzoate
T-2636C - 8 - phenylpropionate
T-2636C - 8 - phenylvalerate The simplest acylating agent is an acid but acid halides and acid anhydrides can also be employed.

When using such acylating agent, it is desirable to conduct the reaction in the presence of a common organic solvent which will not adversely affect the acylation, such as pyridine, tetrahydrofuran, acetone, ether or a mixture of such solvents.

Introduction of acyl groups may be carried out by direct condensation with an acylating agent in the presence or in the absence of a condensing agent such as trifluoroacetic anhydride.

The reaction is usually carried out at room temperature, but it may also be carried out at about 0° C or at an elevated temperature, for about 1 to 50 hrs.

C-8 or 14-acyl derivatives can also be produced by firstly obtaining C-8, 14-diacyl derivatives and then subjecting the diacyl derivatives to partial hydrolysis.

Whereas the C-8, 14-diacyl derivatives are produced by introducing into the hydroxyl groups at positions 14 and 8 of T-2636C an acylating agent containing acyl groups in one or two steps and the two acyl groups are the same or different from each other, the partial hydrolysis is carried out by dissolving the above produced diacyl derivatives in a suitable solvent and treating the solution with an acid or alkali or by contacting it with an adsorbent material (e.g. silica gel or alumina).

With an adsorbent material the hydrolysis occurs by making use of the humidity in the air or a small amount of water contained in the solvent or adsorbent material.

The reaction may be carried out at room temperature or at a lowered or an elevated temperature for several minutes to a few days.

Similarly C-8 or 14-acyl derivatives can be prepared in good yield by the steps of dissolving C diacyl derivatives in a suitable water-soluble organic solvent, contacting the mixture with the acetone powder or crude enzyme preparation obtained from the mycelia or culture filtrate of the antibiotic T-2636C-producing strain, the culture of the strain or the residual liquor after extraction of T-2636C from the cultured broth, and allowing the mixture to stand for a certain period of time.

The T-2636C-producing strain may be, for example, *Streptomyces rochei* var. *volubilis*, a culture of which has been deposited at American Type Culture Collection, Rockville, Md., U.S.A. under the accession number ATCC-21250 the morphological and cultural characteristics of this strain are disclosed in U.S. Pat. No. application Ser. No. 730,113, filed May 17, 1968, now U.S. Pat. No. 3,626,055 dated Dec. 7, 1971.

Furthermore, if the resulting C-8 or 14-acyl derivatives are treated with various different acylating agents, the corresponding C diacyl derivatives whose two acyl groups are different from each other are obtained.

The objective C acyl derivatives may precipitate upon concentration of the reaction mixture or addition of water.

The C acyl derivatives are usually obtained in the reaction system as a mixture of C-14-acyl derivatives, C-8-acyl derivatives and C-8, 14-diacyl derivatives and, if required, it is possible to recover each component in the desired purity by first allowing the mixture to precipitate and then subjecting the precipitates to chromatography or other per se conventional purifiaction means.

The position of acylation of the various C acyl derivatives obtainable according to this invention can be confirmed from their characteristic absorption bands in the hydroxyl region of the infrared spectrum as well as from the shift of the methin protons, to which the acylated hydroxy radical(s) is attached, in the nuclear magnetic resonance (NMR) spectrum (100 MC, $CDCl_3$), as will be seen from the following Table I.

TABLE I

| | IR | NMR $\delta$ (ppm) | |
|---|---|---|---|
| i) C-8, 14-diacyl derivatives of formula I | $\nu^{KBr}$ 3400 to 3600 cm$^{-1}$ none | 4.34 4.05 | approx. 5.3 approx. 5.1 |
| ii) C-14-acyl derivatives of formula I | $\nu^{KBr}$ 3550 to 3500 cm$^{-1}$ ($\nu$OH) | 4.34 | approx. 5.3 |
| iii) C-8-acyl derivatives $\nu$ of formula I | $^{KBr}$ 3450 to 3480 cm$^{-1}$ ($\nu$ OH) | 4.05 | approx. 5.1 |

The objective T-2636C acyl derivatives show improved biological activities and therapeutic effect, inhibiting the growth of Gram positive bacteria both in vitro and in vivo and being effective against strains resistant to *Oleandomycin* and *Erhthromycin*. The T-2636C acyl derivatives may be used for the treatment of various infections of Gram positive bacteria by injection or by oral administration. In general, the dosage of the T-2636C acyl derivatives is 500–2,000 milligrams per day for man.

Presently-preferred embodiments of the invention are shown in the following examples, but are not intended to be construed as limiting the present invention.

In the following examples, parts by weight bear the same relation to parts by volume as do gram(s) to milliliter(s).

EXAMPLE 1

(Production of C-8, 14-diacetate, C-14-acetate and C-8-acetate)

1. In 10 parts by volume of pyridine is dissolved 0.92 part by weight of C, followed by the addition of 0.22 part by volume of acetic anhydride. The mixture is allowed to stand at room temperature for 7 hrs., at the end of which time it is poured into ice water.

The resulting precipitates are recovered by filtation. The procedure yields 1 part by weight of crude substance. This product is column-chromatographed on 30 parts by weight of silica gel (0.05 to 0.20 mm, Merck) and fractionated into four components with use of a benzene-ethyl acetate solvent system.

On the thin layer chromatogram of the above product [benzene:ethyl acetate (2:1), the above silica gel], the four components are detected at Rf values of 0.53, 0.29, 0.15 and 0.05, respectively. They correspond to C-8, 14-diacetate, C-14-acetate, C-8-acetate and C, respectively.

The portion other than the fractions isolated as above is further subjected to thin layer chromatography on the above silica gel and the separated fractions are combined with the fractions obtained by column-chromatography.

The mixture is allowed to crystallize. The procedure yields 0.175 part by weight of C-8, 14-diacetate, 0.097 part by weight of C-14-acetate and 0.087 part by weight of C-8-acetate.

2. In a mixture of 0.5 part of volume of pyridine and 2 parts by volume of tetrahydrofuran is dissolved 0.23 part by weight of C, followed by the addition of a solution of 0.25 part by volume of acetyl chloride in 4 parts by volume of tetrahydrofuran at 0° C under stirring.

The mixture is allowed to react for 1 hr. The reaction product is separated by thin-layer chromatography and allowed to crystallize, whereupon 0.032 part by weight of C-14-acetate (m.p. 207° to 210° C) [hereinafter melting points indicate decomposition points] and 0.034 part by weight of C-8-acetate (m.p. 201° to 202° C) are obtained.

3. In a mixture of 0.2 part by volume of pyridine and 0.8 part by volume of tetrahydrofuran is dissolved 0.23 part by weight of C, followed by the addition of 0.03 part by volume of acetic anhydride. The mixture is allowed to react at room temperature for 5 hours. The result is almost the same as in (2).

Elementary analysis ($C_{27}H_{35}NO_8$):
Calculated: C, 64.65; H, 7.03; N, 2.79
Found: C-14-acetate
  C, 64.61; H, 7.00, N, 2.75
C-8-acetate
  C, 64.62; H, 7.31; N, 2.83

| | C-14-acetate | C-8-acetate |
|---|---|---|
| $[\alpha]$ | $-235°$(C=1.0, EtOH) | $-218°$(C=0.5, EtOH) |
| Ultraviolet absorption spectrum *) | $\lambda_{max}^{EtOH}$ =227 m$\mu$ | $\lambda_{max}^{EtOH}$ = 226 m$\mu$ |
| | (E$_{1\,cm}^{1\%}$ =1050) | (E$_{1\,cm}^{1\%}$ =1010) |

*): hereinafter referred to as UV

EXAMPLE 2

(Production of C-14-acetate, C-8-acetate and C-8, 14-diacetate)

In 50 parts by volume of tetrahydrofuran is dissolved 0.23 part by weight of C, followed by the addition of 0.1 part by volume of acetic acid and 0.1 part by volume of trifluoroacetic anhydride. The mixture is refluxed for 3 hrs., at the end of which time it is concentrated under reduced pressure. The concentrate is poured into water and extracted twice with 50 parts by volume each of ethyl acetate.

The extract is sufficiently washed with 15 parts by volume of water, dehydrated and concentrated under reduced pressure. The concentrate is subjected to thin-layer chromatography on silica gel (HF 254) to separate 0.045 part by weight of C-14-acetate, 0.07 part by weight of C-8-acetate, and 0.02 part by weight of C-8, 14-diacetate.

EXAMPLE 3

(Production of C-8,14-dipropionate, C-14-propionate, and C-8-propionate)

In 10 parts by volume of pyridine is dissolved 0.92 part by weight of C, and 0.25 part by volume of propionic anhydride is added.

The mixture is allowed to stand at room temperature for 7 hrs., at the end of which time it is treated in the same manner as in Example 1 (1). The above procedure yields 0.138 part by weight of C-8,14-dipropionate, 0.138 part by weight of C-14-propionate (m.p. 197° C) and 0.131 part by weight of C-8-propionate (m.p. 203° to 204° C), as colorless crystals.
Elementary analysis ( $C_{28}H_{37}NO_8$ ):
 Calculated: C, 65.23; H, 7.23; N, 2.72
 Found: C-14-propionate
  C, 65.00; H, 7.27; N, 2.76
  C-8-propionate
  C, 64.77; H, 7.26; N, 2.77

|  | C-14-propionate | C-8-propionate |
|---|---|---|
| $[\alpha]_D$ | −222° ( C=0.5, EtOH) | −206° ( C=0.5, EtOH) |
| UV | $\lambda_{max}^{EtOH}$ =227 m$\mu$ | $\lambda_{max}^{EtOH}$ = 226 m$\mu$ |
|  | ($E_{1 cm}^{1\%}$ =1040) | ($E_{1 cm}^{1\%}$ =1110) |

EXAMPLE 4

(Production of C-8, 14-dicrotonate, C-14-crotonate and C-8-crotonate)

In 10 parts by volume of pyridine is dissolved 0.92 part by weight of C, and 0.33 part by volume of crotonic anhydride is added.

The mixture is allowed to stand at room temperature for 17 hrs., at the end of which time it is treated in the same manner as in Example 1 (1).

The procedure yields, as colorless crystals, 0.073 part by weight of C-8,14-dicrotonate, 0.124 part by weight of C-14-crotonate (m.p. 196° C), and 0.075 part by weight of C-8-crotonate (m.p. 198° to 200° C).
Elementary analysis ( $C_{29}H_{37}NO_8$ ):
 Calculated: C, 66.02; H, 7.07; N, 2.65
 Found: C-14-crotonate
  C, 65.77; H, 7.30; N, 2.69
  C-8-crotonate
  C, 66.16; H, 6.40; N, 2.63

|  | C-14-crotonate | C-8-crotonate |
|---|---|---|
| $[\alpha]_D$ | −167° (C=0.5, EtOH) | −160° (C=0.5, EtOH) |
| UV | $\lambda_{max}^{EtOH}$=226 m$\mu$ | $\lambda_{max}^{EtOH}$ = 226 m$\mu$ |
|  | ($E_{1 cm}^{1\%}$ = 1110) | ($E_{1 cm}^{1\%}$ =1100 ) |

EXAMPLE 5

(Production of C-8-(m-bromo) benzoate)

In 1 part by volume of pyridine is dissolved 0.09 part by weight of C, followed by the addition of 0.11 part by volume of m-bromo benzoyl chloride. The resulting mixture is allowed to stand at room temperature for 15 hrs. The reaction mixture is poured into ice-water and the precipitates are recovered by filtration. The precipitates are then subjected to thin layer chromatography on silica gel HF254 (above mentioned) [solvent system-benzene: ethyl acetate (2:1)] and the effective ingredient is allowed to separate from n-hexane. The procedure yields 0.028 part by weight of pale-yellowish powder of C-8-(m-bromo) benzoate.
Elementary analysis ( $C_{32}H_{36}NO_8Br$ ):
 Calculated: C, 59.82; H, 5.65; N, 2.18
 Found: C, 60.10; H, 5.85; N, 2.02
$[\alpha]_D$ −66.3° ( C=0.32, EtOH )

UV    $\lambda_{max}^{EtOH}$ = 226 m$\mu$    ($E_{1 cm}^{1\%}$ = 1020).

EXAMPLE 6

(Production of C-8-benzoate and C-14-benzoate)

In 10 parts by volume of pyridine is dissolved 0.92 part by weight of C, followed by addition of 0.542 part by weight of benzoic anhydride.

The mixture is allowed to stand for the 15 hrs. at room temperature, at the end of which time the reaction mixture is poured into ice water to give precipitates. The precipitates are extracted with 300 parts by volume of ethyl acetate. The extract is washed with dil. HCl, dil. NaHCO$_3$, and water in that order and dried with sodium sulfate anhydride, followed by concentration and thin layer chromatography on silica gel HF 254, [solvent system-benzene:ethyl acetate (2:1)].

These procedures yield 0.079 part by weight of C-14-benzoate (m.p. 186° to 188° C) and 0.052 part by weight of C-8-benzoate (m.p. 203° to 206° C).
Elementary Analysis ($C_{32}H_{37}NO_8$):
(C-14-benzoate
 Calculated: C, 68.19; H, 6.62; N, 2.49
 Found: C, 67.92; H, 6.51; N, 2.60
$[\alpha]_D$ = −90.2° (C=0.5, EtOH)
UV: $\lambda_{max}^{EtOH}$ = 227.5 m$\mu$ ($E_1$ cm$^1$% = 933)

EXAMPLE 7

(Production of C-8-phenylpropionate and C-14-phenylpropionate)

In 10 parts by volume of pyridine is dissolved 0.92 part by weight of C, followed by addition of 0.5 part by volume of phenylpropionyl chloride.

The mixture is allowed to stand at room temperature for 15 hrs, at the end of which time the reaction mixture is poured into ice water to give precipitates. The precipitates are filtered, washed and chromatographed on 30 parts by weight of silica gel (0.05 to 0.2 mm, Merck) to obtain two components which are subjected to further purification procedure with silica gel chromatography.

These procedures yield 0.085 part by weight of C-14-phenylpripionate and 0.097 part by weight of C-8-phenyl-propionate.

Analytical Value

|  | C-14-phenylpropionate | C-8-phenylpropionate |
|---|---|---|
| Elementary Analysis ($C_{34}H_{41}NO_8$) |  |  |
| Calc'd. | C,69.01; H,6.98; N,2.37 | C,69.1; |

| Found | C, 69.69; H, 6.99; N, 2.31 | C, 68.86; H, 6.98; N, 2.37 |
|---|---|---|
| $[\alpha]_D^{23}$ | $-157.2°(C=0.5, EtOH)$ | H, 6.84; N, 2.37 $-140.2°(C=0.5, EtOH)$ |
| $\lambda_{max}^{EtOH}$ | 227 mμ ($E_{1\,cm}^{1\%}=735$) | 226 mμ ($E_{1\,cm}^{1\%}=754$) |

EXAMPLE 8

(Production of C-14-nicotinate)

In a mixture of 10 parts by volume of tetrahydrofuran and 2 parts by volume of pyridine are dissolved 0.92 part by weight of C and 0.5 part by weight of nicotinyl chloride hydrochloride and the mixture is kept standing at room temperature for 15 hrs. To the reaction mixture is added 300 parts by volume of ethyl acetate and 150 parts by volume of water, and after separating the ethyl acetate layer, the aqueous layer is adjusted to pH 7 and extracted with ethyl acetate. The extract is washed under ice cooling with water, and after drying with anhydrous sodium sulfate, chromatographed on 30 parts by weight of silica gel (0.05 to 0.2 mm, Merck). The eluate with a mixed solution of benzene-ethyl acetate (5:5 to 2:8) is concentrated.

The concentrate is subjected to thin layer chromatography on 320 parts by weight of silica gel [solvent system-benzene:ethyl acetate ((1:2)] to give 0.094 part by weight of C-14-nicotinate [m.p. 185° to 187° C].

Elementary Analysis ($C_{31}H_{36}N_2O_8$):
  Calculated: C, 65.94; H, 6.43; N, 4.96
  Found: C, 65.51; H, 6.51; N, 4.55
$[\alpha]_D^{26} = -93.6°$ (C = 0.409, EtOH)
UV: $\lambda_{max}^{EtOH} = 225.5\,m\mu$ ($E_{1\,cm}^{1\%} = 888$)

EXAMPLE 9

(Production of C-8, 14-diacetate

1  In a mixture of 0.5 part by volume of pyridine and 2 parts by volume of tetrahydrofuran is dissolved 0.23 part by weight of C and while the solution is cooled with ice-water under stirring, a solution of 0.15 part by volume of acetyl chloride in 8 parts by volume of tetrahydrofuran is gradually added thereto, and the mixture is allowed to stand for 1 hr.

Then, the reaction mixture is poured into ice water. The precipitates are recovered by filtration and recrystallized from a mixture of n-hexane and ethyl acetate, whereupon 0.21 part by weight of crystals of C-8.14-diacetate is obtained.

2  In a mixture of 0.5 part by volume of pyridine and 2.0 parts by volume of tetrahydrofuran is dissolved 0.23 part by weight of C, followed by the addition of 0.5 part by volume of acetic anhydride.

The mixture is allowed to stand at room temperature for 15 hrs.

The reaction product is treated in the same manner as in (1) and, then, recrystallized from ether. The procedure yields 0.18 part by weight of pure crystals of C-8, 14-diacetate (m.p. 136° to 140°C).

Elementary analysis ($C_{29}H_{37}NO_9$):
  Calculated: C, 64.07; H, 6.86; N, 2.58
  Found: C, 63.77; H, 6.89; N, 2.74
$[\alpha]_D = -211°$ (C=0.5, EtOH)
UV: $\lambda_{max}^{EtOH} = 226\,m\mu$ ($E_{1\,cm}^{1\%} = 867$)

EXAMPLE 10

(Production of C-8, 14-diacetate)

In 1 part by volume of pyridine is dissolved 0.1 part by weight of C-14-acetate, followed by the addition of 0.5 part by volume of acetic anhydride. The mixture is allowed to stand at room temperature for 16 hrs., at the end of which time the reaction mixture is poured into ice water. The precipitates are recovered by filtration and recrystallized from a mixture of ether and n-hexane.

The procedure yields 0.08 part by weight of colorless prisms of C-8, 14-diacetate

EXAMPLE 11

(Production of C-8, 14-dipropionate)

In 5 parts by volume of pyridine is dissolved 0.23 part by weight of C, followed by the addition of 1.04 part by volume of propionic anhydride. The mixture is allowed to stand at 0° C for 48 hrs., at the end of which time the reaction mixture is poured into ice water. The resulting precipitates are recovered by filtration and recrystallized from either - n-hexane.

The procedure yields 0.23 part by weight of colorless crystals of C-8, 14-dipropionate (m.p. 185° to 186° C).

Elementary analysis ($C_{31}H_{41}NO_9$):
  Calculated: C, 65.13; H, 7.23; N, 2.45
  Found: C, 64.98; H, 7.20; N, 2.38
$[\alpha]_D = -206°$ (C = 0.5, EtOH)
UV: $\lambda_{max}^{EtOH} = 226\,m\mu$ ($E_{1\,cm}^{1\%} = 883$)

EXAMPLE 12

(Production of C-8, 14-dicrotonate)

In 5 parts by volume of pyridine is dissolved 0.23 part by weight of C, followed by the addition of 1 part by volume of crotonic anhydride.

The mixture is allowed to stand at room temperature for 15 hrs., at the end of which time the reaction mixture is poured into ice water. The resulting precipitates are recovered by filtration and recrystallized from ether - n-hexane, whereupon 0.23 part by weight of colorless crystals of C-8, 14-dicrotonate is obtained (m.p. 193° to 195° C).

Elementary analysis ($C_{33}H_{41}NO_9$):
  Calculated: C, 66.54; H, 6.94; N, 2.35
  Found: C, 66.21; H, 7.02; N, 2.31
$[\alpha]_D = -120°$ (C = 0.5, EtOH)
UV: $\lambda_{max}^{EtOH} = 226\,m\mu$ ($E_{1\,cm}^{1\%} = 1060$)

EXAMPLE 13

(Production of C-8, 14-disuccinate)

In 4 parts by volume of pyridine is dissolved 0.23 part by weight of C, followed by the addition of 0.5 part by weight of succinic anhydride. The mixture is allowed to stand at 0° C for 15 hrs., at the end of which time it is poured into ice water.

The mixture is extracted with 200 parts by volume of ethyl acetate and the extract is washed with water and transferred to a 2 percent aqueous $NaHCO_3$ solution under cooling. The solution is brought to pH 2 by the addition of 4N HCl and then extracted with 200 parts by volume of ethyl acetate.

The extract is washed with 50 parts by volume of water and dried over sodium sulfate, followed by concentration. The concentrate is allowed to crystallize from ethyl acetate-ether.

The procedure yields 0.05 part by weight of colorless needles (m.p. 148° to 152° C).

Elementary analysis ($C_{33}H_{41}NO_{13}$):
  Calculated: C, 60.08; H, 6.26; N, 2.12
  Found: C, 59.99; H, 6.51; N, 2.51
$[\alpha]_D^{22} = -210°$ (C = 0.5, EtOH)
UV: $\lambda_{max}^{EtOH} = 226$ m$\mu$ ($E_{1\ cm}^{1\%} = 904$)

EXAMPLE 14

(Production of C-8, 14-di(trifluoro)acetate)

In 10 parts by volume of tetrahydrofuran is dissolved 0.92 part by weight of C, followed by addition of 1.5 parts by volume of trifluoro acetic anhydride under ice cooling and the mixture is allowed to stand at room temperature under stirring for 2 hrs. The reaction mixture is poured into ice water to give precipitates, which are immediately extracted with 300 parts by volume of ether. The extract is washed with water, concentrated and kept standing at 0° to 5° C to crystallize.

The crystalls are recrystallized from ether to yield 0.75 part by weight of C-8, 14-di(trifluoro)acetate as colorless needles (m.p. 152° to 154° C).
Elementary Analysis ($C_{29}H_{31}NO_9F_6$):
  Calculated: C, 53.46; H, 4.80; N, 2.15
  Found: C, 53.49; H, 4.81; N, 2.17
$[\alpha]_D^{26} = -235°$ (C=0.854, CHCl$_3$)
UV: $\lambda_{max}^{EtOH} = 227$ m$\mu$ ($E_{1\ cm}^{1\%} = 702$)

EXAMPLE 15

(Production of C-14-acetyl-8-propionate)

In 5 parts by volume of pyridine is dissolved 0.25 part by weight of C-14-acetate, followed by the addition of 0.26 part by volume of propionic anhydride. The mixture is allowed to stand at 0° C for 48 hrs., at the end of which time the reaction mixture is treated in the same manner as in Example 10.

The procedure yields 0.245 part by weight of colorless prisms of C-14-acetyl-8-propionate (m.p. 174° to 178° C).
Elementary analysis ($C_{30}H_{39}NO_9$):
  Calculated: C, 64.62; H, 7.05; N, 2.51
  Found: C, 64.24; H, 6.98; N, 2.53
$[\alpha]_D = -217°$ (C = 0.5, EtOH)
UV: $\lambda_{max}^{EtOH} = 226$ m$\mu$ ($E_{1\ cm}^{1\%} = 944$)

EXAMPLE 16

(Production of C-14-acetyl-8-crotonate)

In 5 parts by volume of pyridine is dissolved 0.25 part by weight of C-14-acetate, followed by the addition of 0.31 part by volume of crotonic anhydride.

The mixture is allowed to stand at room temperature for 48 hrs., at the end of which time the reaction mixture is treated in the same manner as Example 10.

The procedure yields 0.173 part by weight of pale-yellowish crystals of C-14-acetyl-8-crotonate (m.p. 115° to 124° C).
Elementary analysis ($C_{31}H_{39}NO_9$):
  Calculated: C, 65.36; H, 6.90; N, 2.46
  Found: C, 65.55; H, 7.24; N, 2.41
$[\alpha]_D = -170°$ (C=0.5, EtOH)
UV: $\lambda_{max}^{EtOH} = 227$ m$\mu$ ($E_{1\ cm}^{1\%} = 1040$)

EXAMPLE 17

(Production of C-14-acetyl-8-(m-bromo)benzoate)

In 10 parts by volume of pyridine is dissolve 0.5 part by weight of C-14-acetate, followed by the addition of 0.28 part by weight of m-bromobenzoyl chloride. The mixture is allowed to stand overnight at room temperature and the reaction mixture is poured into 100 parts by volume of ice-water, whereupon 0.527 part by weight of precipitates is obtained.

The precipitates are dissolved in a small amount of ethyl acetate under heating and the solution is allowed to cool, whereupon crystals separate. The crystals are recrystallized from ethyl acetate to give 0.3 part by weight of colorless needles of C-14-acetyl-8-(m-bromo) benzoate (m.p. 201° to 203° C).
Elementary analysis ($C_{34}H_{38}NO_9Br$):
  Calculated: C, 59.65; H, 5.60; N, 2.05; Br, 11.67
  Found: C, 59.95; H, 5.53; N, 1.96; Br, 11.75
$[\alpha]_D = -98°$ (C=1.0, CHCl$_3$)
UV: $\lambda_{max}^{EtOH} = 227.5$ m$\mu$ ($E_{1\ cm}^{1\%} = 892$)

EXAMPLE 18

(C-14-propionyl-8-acetate)

In 4 parts by volume of pyridine is dissolved 0.1 part by weight of C-8-acetate, followed by the addition of 0.2 part by volume of propionic anhydride.

The mixture is allowed to stand overnight at room temperature and, then, poured into 100 parts by volume of ice water.

The precipitates are recovered by filtration, washed with 20 parts by volume of water, dried and allowed to stand to crystallize from ether - n-hexane.

The procedure yields 0.08 part of C-14-propionyl-8-acetate (m.p. 190° to 192° C).
Elementary analysis ($C_{30}H_{39}NO_9$):
  Calculated: C, 64.62; H, 7.05; N, 2.51
  Found: C, 64.33; H, 7.10; N, 2.78
$[\alpha]_D^{22} = -176°$ (C=0.5, EtOH)
UV: $\lambda_{max}^{EtOH} = 227$ m$\mu$ ($E_{1\ cm}^{1\%} = 980$)

EXAMPLE 19

(Production of C-8-acetate)

1. In 250 parts by volume of methanol is dissolved 0.1 part by weight of C-8, 14-diacetate, followed by the addition of 750 parts by volume of Sörensen's phosphate buffer solution at pH 6.6. The mixture is held at 32° C and 10 parts by weight of the acetone powder sample prepared from the mycelia of Streptomyces rochei var. volubilis (ATCC 21250) is added. The mixture is allowed to stand for 2 hrs., at the end of which time it is filtered.

Water is added to the filtrate, followed by extraction with ethyl acetate.

The extract is washed with water and concentrated under reduced pressure.

From the concentrate, the effective ingredient is separated by thin layer chromatography on silica gel.

It is allowed to crystallize from ether, whereupon 0.05 part by weight of colorless prisms is obtained.

From its infrared absorption spectrum, nuclear magnetic resonance spectrum, mixed melting point and other data, this product is identified as C-8-acetate.

2 In 2,500 parts by volume of methanol is dissolved 10.8 parts by volume of C-8, 14-diacetate, and with stirring the solution is poured into 7,500 parts by volume of the residue liquor obtained after extraction of the culture of Streptomyces rochei var. volubilis (ATCC 21250) with ethyl acetate.

The mixture is allowed to stand at about 37° C for 1.5 hrs. The methanol is distilled off from the mixture under reduced pressure and the residue is extracted with 3,000 parts by volume of ethyl acetate. The ethyl acetate layer is washed with 1,000 parts by volume of 2 percent NaHCO₃ and with 800 parts by volume of water, followed by dehydration. It is then concentrated under reduced pressure, whereupon colorless crystals are obtained. The crystals are further allowed to crystallize from ethyl acetate.

The procedure yields 7.9 parts by weight of C-8-acetate (m.p. 201° to 202° C).

EXAMPLE 20

(Production of C-14-acetate and C-8-acetate

1 In 5 parts by volume of methanol is dissolved 0.1 part by weight of C-8, 14-diacetate and 2.5 parts by volume of 0.1 N HCl is added.

The resulting mixture is allowed to stand at room temperature for 60 hrs., at the end of which time water is added to the reaction mixture, followed by extraction with 100 parts by volume of ethyl acetate. The extract is washed with water and concentrated.

The concentrate is subjected to silica gel chromatography for separation and purification of the effective ingredient.

The procedure yields 0.025 part by weight of C-14-acetate and 0.020 part by weight of C-8-acetate.

2 In 25 parts by volume of methanol is dissolved 0.1 part by weight of C-8, 14-diacetate, followed by the addition of 25 parts by volume of a 2 percent aqueous NaHCO₃ solution. The mixture is stirred at room temperature for 30 minutes, at the end of which time it is treated in the same manner as in (1).

The procedure yields 0.02 parts by weight of C-14-acetate and 0.015 part by weight of C-8-acetate.

EXAMPLE 21

(Production of C-8-(trifluoro)acetate)

0.86 part by weight of C-8, 14-di(trifluoro)acetate is chromatographed on 30 parts by weight of silica gel (0.05 to 0.2 mm, Merck) and eluted with a solvent system of benzene and ethyl acetate (7:3 to 6:4). The C-8, 14-di(trifluoro)acetate di(trifluoro)acetate is partially hydrolyzed on the surface of the silica gel.

The eluate is concentrated to give 0.27 part by weight of C-8-(trifluoro)acetate as colorless prisms. (m.p. 150° to 153° C).

Elementary analysis ($C_{27}H_{32}NO_8F_3$):
Calculated: C, 58.37; H, 5.80; N, 2.52
Found: C, 58.53; H, 5.69; N, 2.89
$[\alpha]_D^{23} = -216.6°$ (C=0.5, EtOH)
UV: $\lambda_{max}^{EtOH} = 226\ m\mu$ ($E_{1\ cm}^{1\%} = 812$)

EXAMPLE 22

(Production of C-8-propionate)

In 200 parts by volume of water is dissolved 0.2 part by weight of a crude enzyme preparation obtained from the cultured broth of *Streptomyces rochei* var *volubilis* (ATCC 21250), to which is added 0.1 part by weight of C-14-acetyl-8-propionate dissolved in 40 parts by volume of methanol. The mixture is allowed to stand at 25° C under stirring for one hr., followed by extraction with 300 parts by volume of chloroform and 100 parts by volume of water.

The extract is concentrated and recrystallized from ethyl acetate-ether to give 0.08 part by weight of crystals, which is confirmed to be C-8-propionate by infrared spectrum, nuclear magnetic resonance spectrum and the Rf value determined by chromatography on silica gel.

EXAMPLE 23

(Production of C-8-crotonate)

0.1 part by weight of C-14-acetyl-8-crotonate is treated in the same manner as in Example 2 to give 0.075 part by weight of crystals, which is confirmed to be C-8-crotonate by infrared spectrum, nuclear magnetic resonance spectrum, and the Rf value determined by chromatography on silica gel.

EXAMPLE 24

(Production of C-8-benzoate)

In 1 part by volume of pyridine is dissolved 0.1 part by weight of C-14-acetate and 0.2 part by weight of benzoic anhydride.

The mixture is allowed to stand at room temperature for 15 hrs. and poured into ice water to obtain precipitates.

The precipitates are collected, washed and dissolved in 10 parts by volume of methanol, to which is added 0.05 part by weight of crude enzyme preparation (referred to in Example 22) dissolved in 50 parts by volume of water, and the mixture is treated in the same manner as in Example 22.

The obtained concentrate is chromatographed on silica gel HF 254 and eluted with a mixed solvent of benzene-ethyl acetate (1:1) to give 0.01 part by weight of crystals, which is confirmed to be C-8-benzoate by infrared spectrum, melting point and the Rf value determined by chromatography on silica gel.

What is claimed is:

1. An acyl derivative of Antibiotic T-2636C of the formula

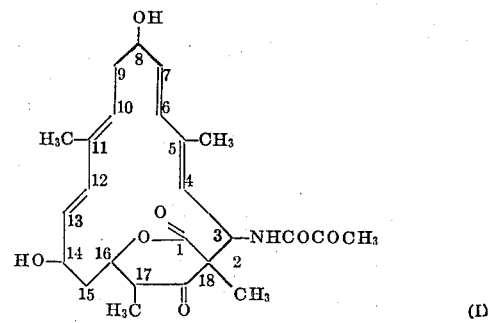

(I)

wherein the acyl derivative is a member selected from the group consisting of a. a compound I having the hydrogen atom of the hydroxy group at position 14 replaced by R—CO— and b. a compound I having the hydrogen atom at the hydroxyl group at position 8 replaced by R—CO— wherein R is (1) hydrogen, (2) alkyl of two to five carbon atoms in the case of compound (a) and one to five carbon atoms in the case of compound (b), optionally substituted by carboxyl or halogen, (3) alkenyl of up to five carbon atoms, (4) phenyl, optionally substituted by halogen, (5) pyridino and (6) aralkyl of seven to 10 carbon atoms.

2. The compound according to claim 1, namely T-2636C-14-propionate.

3. The compound according to claim 1, namely T-2636C-14-crotonate.

4. The compound according to claim 1, namely T-2636C-14-nicotinate.

5. The compound according to claim 1, namely T-2636C-14-benzoate.

6. The compound according to claim 1, namely T-2636C-14-phenylpropionate.

7. The compound according to claim 1, namely T-2636C-8-formate.

8. The compound according to claim 1, namely T-2636C-8-acetate.

9. The compound according to claim 1, namely T-2636C-8-trifluoroacetate.

10. The compound according to claim 1, namely T-2636C-8-propionate.

11. The compound according to claim 1, namely T-2636C8-crotonate.

12. The compound according to claim 1, namely T-2636C-8-benzoate.

13. The compound according to claim 1, namely T-2636-8-(m-bromo)benzoate.

14. The compound according to claim 1, namely T-2636C-8-phenylpropionate.

15. The compound according to claim 8, namely T-2636C-8, 14-disuccinate.

16. The compound according to claim 1, namely, T-2636C-14-butyrate.

17. The compound according to claim 1, namely, T-2636C-14-valerate.

18. The compound according to claim 1, namely, T-2636C-8-valerate.

* * * * *